United States Patent
Sorensen

(10) Patent No.: US 6,637,071 B2
(45) Date of Patent: Oct. 28, 2003

(54) INTEGRATED CASTER AND LEVELER

(76) Inventor: Mark C. Sorensen, 23 Woodhill Dr., Redwood City, CA (US) 94061

( * ) Notice: Subject to any disclaimer, the term of this patent is extended or adjusted under 35 U.S.C. 154(b) by 0 days.

(21) Appl. No.: 10/086,178

(22) Filed: Feb. 25, 2002

(65) Prior Publication Data

US 2002/0174512 A1 Nov. 28, 2002

Related U.S. Application Data

(63) Continuation-in-part of application No. 09/570,820, filed on May 15, 2000, now abandoned, which is a continuation-in-part of application No. 09/454,499, filed on Dec. 6, 1999, now abandoned.

(51) Int. Cl.$^7$ .............................................. B60B 33/06
(52) U.S. Cl. ............................ 16/32; 16/19; 16/42 R; 16/33
(58) Field of Search ....................... 16/18 R, 19, 29, 16/32, 35 R, 42 R, 33

(56) References Cited

U.S. PATENT DOCUMENTS

| | | | | |
|---|---|---|---|---|
| 4,364,148 A | * | 12/1982 | McVicker | ........................ 16/32 |
| 5,383,536 A | * | 1/1995 | Butter et al. | ................ 188/1.12 |
| 5,390,393 A | * | 2/1995 | Reppert et al. | ................. 16/21 |
| 5,774,936 A | * | 7/1998 | Vetter | ........................... 16/35 R |

* cited by examiner

Primary Examiner—Gary Estremsky
Assistant Examiner—Mark Williams
(74) Attorney, Agent, or Firm—Jill L. Robinson

(57) ABSTRACT

A one-piece caster and leveler assembly to aid in the transportation and installation of equipment that combines a leveler with a rotable foot and a wheel chassis. During movement of the equipment, the leveler may be placed in a retracted position where the rotable foot contacts and pitches away from the wheels, and rotates as the direction of movement changes, providing improved clearance, load capacity and tolerance for striking obstacles.

34 Claims, 10 Drawing Sheets

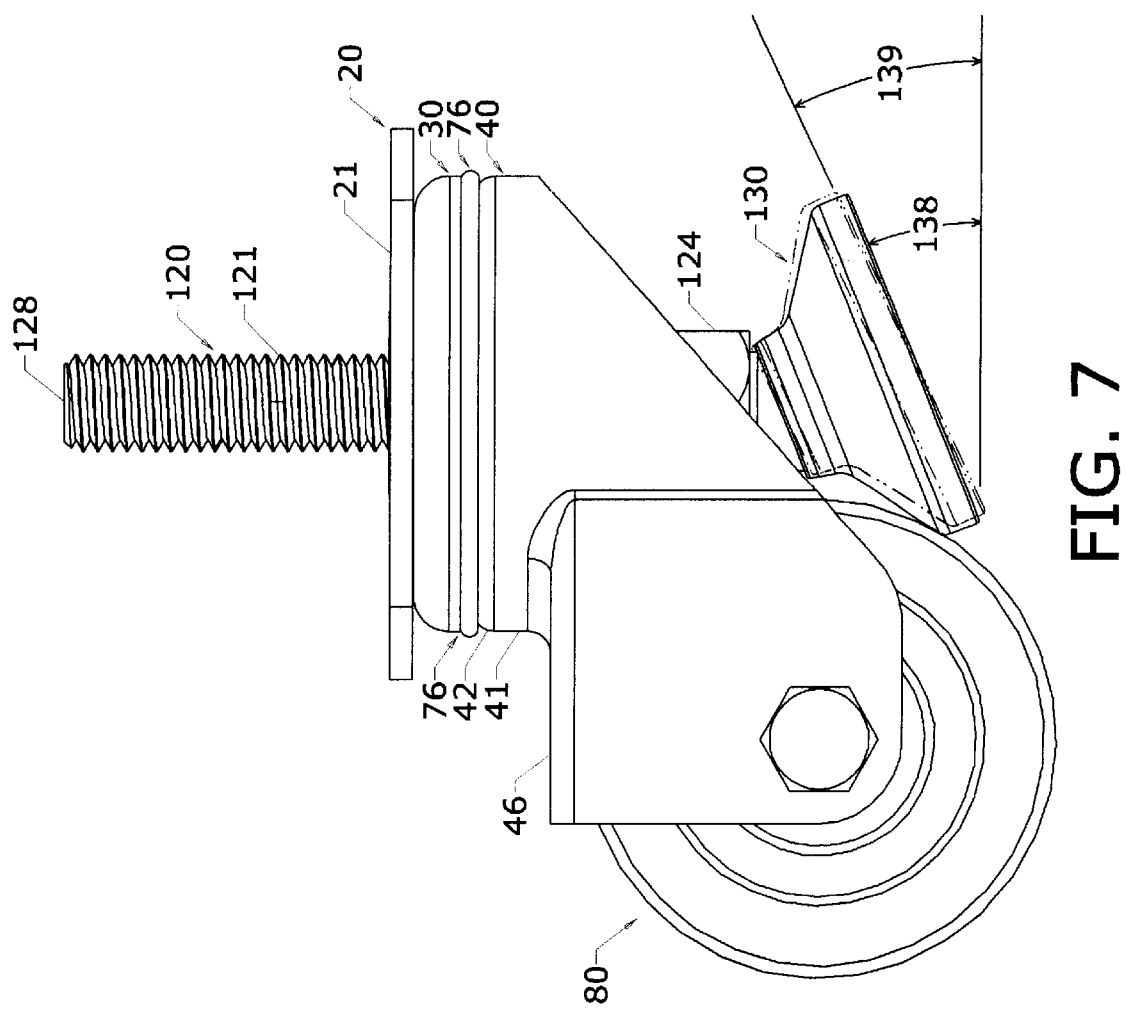

INTEGRATED CASTER AND LEVELER

CROSS REFERENCE TO RELATED APPLICATIONS

This is a CONTINUATION-IN-PART of U.S. patent application Ser. No. 09/570,820, filed May 15, 2000 (which is incorporated by reference herein), which is a CONTINUATION-IN-PART of U.S. patent application Ser. No. 09/454,499, filed Dec. 6, 1999 (now abandoned).

TECHNICAL FIELD

This invention relates generally to devices and methods for aiding the moving and installation of equipment. Specifically, the present invention is related to a caster with an integral leveling component.

BACKGROUND—DESCRIPTION OF PRIOR ART

Equipment, particularly heavy equipment, is often supplied with two mechanical components that aid in moving and installation. These are casters and levelers, respectively. A caster generally comprises a wheel mounted on a chassis capable of swiveling 360 degrees. Levelers generally comprise a threaded stud and a foot that are connected by means of a ball-socket joint. They serve to establish a level, final height of a unit and secure it with respect to the ground. Installing these components may be complicated, especially when the equipment is vulnerable to tipping during movement.

Placement of levelers and casters is governed by three competing constraints: stability, adjustability, and clearance. Stability refers to the overall equipment stability: that is, ensuring that the equipment does not tip over easily. To achieve maximum equipment stability, the devices that support the equipment should be positioned as far as possible from the equipment's center of gravity. Adjustability refers to the ability to access the leveler for adjustment once the unit is put into place. For instance, if the unit is intended to mate to another unit or occupy space against a wall, a leveler may become inaccessible if it is positioned in a corner. Clearance refers to the placement of the casters and levelers relative to each other. In particular, it is essential that the casters do not interfere with the levelers as the casters swivel about 360 degrees during movement of the equipment.

These constraints can create a real problem for a designer or engineer when both casters and levelers are desirable in the application. For example, to achieve maximize equipment stability when the levelers are used, the levelers should ideally be positioned in the corners of the equipment. However, to minimize the chance of the equipment tipping during movement of the equipment, the casters should also occupy the corner positions. Obviously, with standard casters and levelers, it is not possible to have both the casters and the levelers in the same corner position. To compound the problem of achieving stability, reducing unit footprint is often of competitive advantage and of critical marketing importance in many applications. A good example can be found in the semiconductor industry. Here, the size of processing equipment is scrutinized because it will likely occupy clean-room space that costs a premium per unit area. Semiconductor equipment must also comply with rigorous safety specifications such as SEMI, which mandates stability at a 10 degree tilt angle. However, if the unit's footprint is reduced there may be little room for both casters and levelers to be placed in a stable configuration. As a result, expensive solutions, such as retractable booms and counterweights, are often employed that far exceed the cost of the casters and levelers themselves.

Traditional, separate casters and levelers suffer from additional technical and cost disadvantages. In order for the leveler stud to be well-supported when the weight of the equipment rests on the levelers, it is typical to incorporate a machined support that extends below the base of the frame. The drawback of this design is that the leveler cannot be retracted very far off the ground. Thus, when the unit is moved, not only does the leveler cause the unit to have poor ramp clearance, the leveler is unprotected and vulnerable to damage by striking obstacles. To mitigate this problem, designers often will choose more expensive leveling components with larger stud diameters and far greater load capacities than are necessary to support the unit.

Another potential problem with separate casters and levelers is the inability to adjust the leveler from the top. The ability to adjust a leveler from the top is especially desirable in high technology applications. However, in many current designs that use traditional, separate casters and levelers, the levelers cannot be adjusted from the top because in order to achieve overall unit stability the design requires that the leveler be placed interior to a vertical frame member of the supported unit.

Finally, it is expensive to properly install traditional, separate casters and levelers. In a typical high quality installation, several custom machined parts must be made to provide proper support. In addition to the cylindrical support for the leveler, a plug is often machined to incorporate this support into the base of the vertical tube member and a gusset that straddles the two corner members of the frame base is often required to support the caster. All these parts must be jigged and welded in place on a custom basis. If these parts can be eliminated the cost savings can be substantial.

Combination casters and levelers do exist. Some of these devices place a leveler between separated wheels to allow for retraction of the leveler. However, the separation of wheels results in a loss of load capacity and usually requires the use of a non-standard leveler with a smaller floor contact area than is provided by a standard leveler. Other combined caster and leveler devices achieve leveler clearance by incorporating a large wheel offset, using very small wheels, using a non-standard leveling component, placing the leveler offset from the swivel axis of the caster, or using a combination of the foregoing. These designs often have significant disadvantages that may outweigh the benefits of the combination, including decreased load capacity, poor handling, large size, awkward appearance, increased potential for floor damage, impractical leveler adjustment, high cost and unpredictable leveler location.

SUMMARY OF THE INVENTION

The present invention integrates a caster and a leveler that are very similar in design to standard casters and levelers. The combination offers moving and support capability in a one-piece assembly no larger than an ordinary caster. The integrated device is simple in design and has widespread application wherever a design requires both casters and levelers.

This integrated caster and leveler assembly generally comprises a wheel chassis, a thrust bearing assembly, and a leveling sub-assembly disposed within an internally threaded and proximally located tubular member, such as a kingpin rivet. The integrated caster and leveler assembly may combine these and other elements to reliably aid in the transport and installation of various types of equipment. If a kingpin rivet is used, a base plate may be included to facilitate attachment to the supported equipment. The base may be a rectangular plate and may have mounting holes for screws and the like that attach to a frame member of the unit. The base may also be a corner bracket to take full advantage of caster and leveler integration and allow maximum stability and leveler adjustability. Alternatively, the outer surface of the tubular member may be threaded to allow the device to be mounted to the equipment.

The thrust bearing assembly generally comprises an upper and lower raceway supporting an upper and lower set of ball bearings, a shim for proper bearing spacing, and an o-ring seal that protects it from environmental contamination.

The integrated device includes elements similar to high quality dual bearing casters; however, the integrated device includes the internally threaded tubular member, and has a wheel chassis with a slightly larger offset (the distance from the swivel axis to the wheel axis) than is found in most standard casters. These features allow the leveling sub-assembly to thread through the tubular member. The leveling sub-assembly is similar to a standard leveler and comprises a stud, a foot, and a locknut. However, the foot attaches to the stud by a ball-socket joint, which rotates with three rotational degrees of freedom, or is otherwise attached to achieve at least two rotational degrees of freedom, and ideally pivots very smoothly, even at a high pitch angle. As the leveler is retracted, a portion of the foot will contact the circumference of the wheel and pivot so that the opposite edge of the foot pitches upward, away from the wheels. Significantly, this allows the leveler to be aligned with the swivel axis while maintaining close proximity to the caster wheels. Additionally, these features allow the wheels of the caster to be placed close together without placing the leveler at a substantial offset from the swivel axis, thus improving load capacity over combined caster and leveler devices that place the leveler between separated wheels. They also allow the distance between the leveler and casters to be reduced while maintaining approximately standard-sized wheels and leveler footpads.

In use, when retracted, the leveler foot responds dynamically to changes in the direction of motion of the unit such that the leading edge of the foot is always higher than the trailing edge. This offers two technical advantages compared to standard casters and levelers that substantially reduce the risk of damage to the equipment and to the leveler. First, ramp clearance is greatly improved due to the pitched foot and its proximity to the caster wheels. Second, the leveler is effectively braced against the wheel or wheels insulating the stud from damage and providing better distribution of impact loads.

The device may be designed so that in the fully retracted position, the leveler foot is pitched upwards to a selected nominal pitch angle that is less than a selected maximum pitch angle. This maximum pitch angle should be selected to be at or less than the angle at which the foot may bind, swivel may be impeded and/or the foot may eject from the ball end of the stud. For a given wheel size, the dimensions of the stud may be selected so that the pitch angle of the foot rests at this nominal pitch angle and never exceeds the maximum pitch angle in the fully-retracted position. This ensures smooth, non-binding interaction between the wheels and leveler foot as the wheel swivels and the foot pivots about the longitudinal axis of the leveler stud. Furthermore, small mechanical features that differentiate the leveler from a standard leveler may be included in the design. These features include a small shoulder between the hex portion and the ball-end of the stud and a curved rim on top of a tongue that circumscribes the socket of the foot.

For overhead adjustability, the upper end of the stud may include an appropriately sized hex socket, much like a set screw. The stud can also have a hex portion that permits bottom adjustment with a wrench. The locknut may be a standard nut and serves to secure the leveler once installation is complete it should be noted that while most applications of the claimed device would be in industry to move and support heavy manufacturing equipment, "equipment" as used herein includes any object that needs to be moved and/or supported, in any environment. For example, and without limitation, this device could be used on beds and other furniture, vending machines, home appliances and pianos. In summary, this invention comprises a leveling assembly combined with a caster to create a one-piece assembly with the characteristics of both. The design has a number of advantages including, but not limited to, a single purchased part, improved stability, better leveler adjustability, a compact assembly, leveler protection, and a lower cost of installation. The nature of the present invention will be more readily understood after consideration of the drawings and the detailed description of the preferred embodiment that follow.

BRIEF DESCRIPTION OF THE DRAWINGS

FIG. 7 is a side view of the integrated caster and leveler with the leveler in the retracted position where the foot is pitched upwards to the nominal pitch angle. The phantom outline of the foot at the maximum pitch angle is also shown.

DETAILED DESCRIPTION OF THE PREFERRED EMBODIMENT

The integrated caster and leveler assembly generally comprises a leveling sub-assembly disposed within an internally threaded and proximally located kingpin rivet fastening permanently a base plate, a wheel chassis, and a thrust bearing assembly. The integrated caster and leveler assembly may combine these and other elements to reliably aid in the transport and installation of various kinds of equipment.

Figure 1:
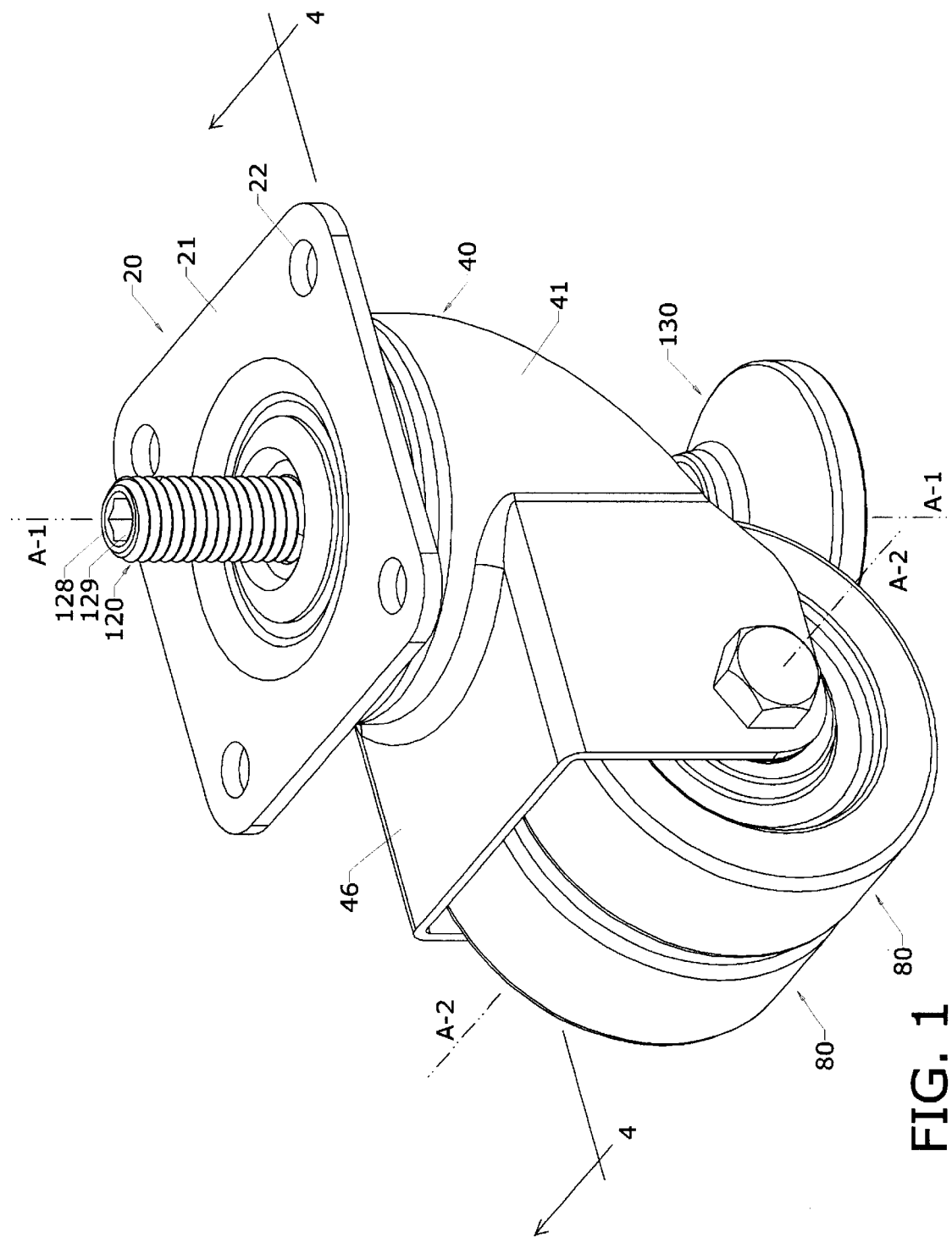
FIG. 1 is a perspective view of a first embodiment of the integrated caster and leveler according to the present invention.
Figure 2:
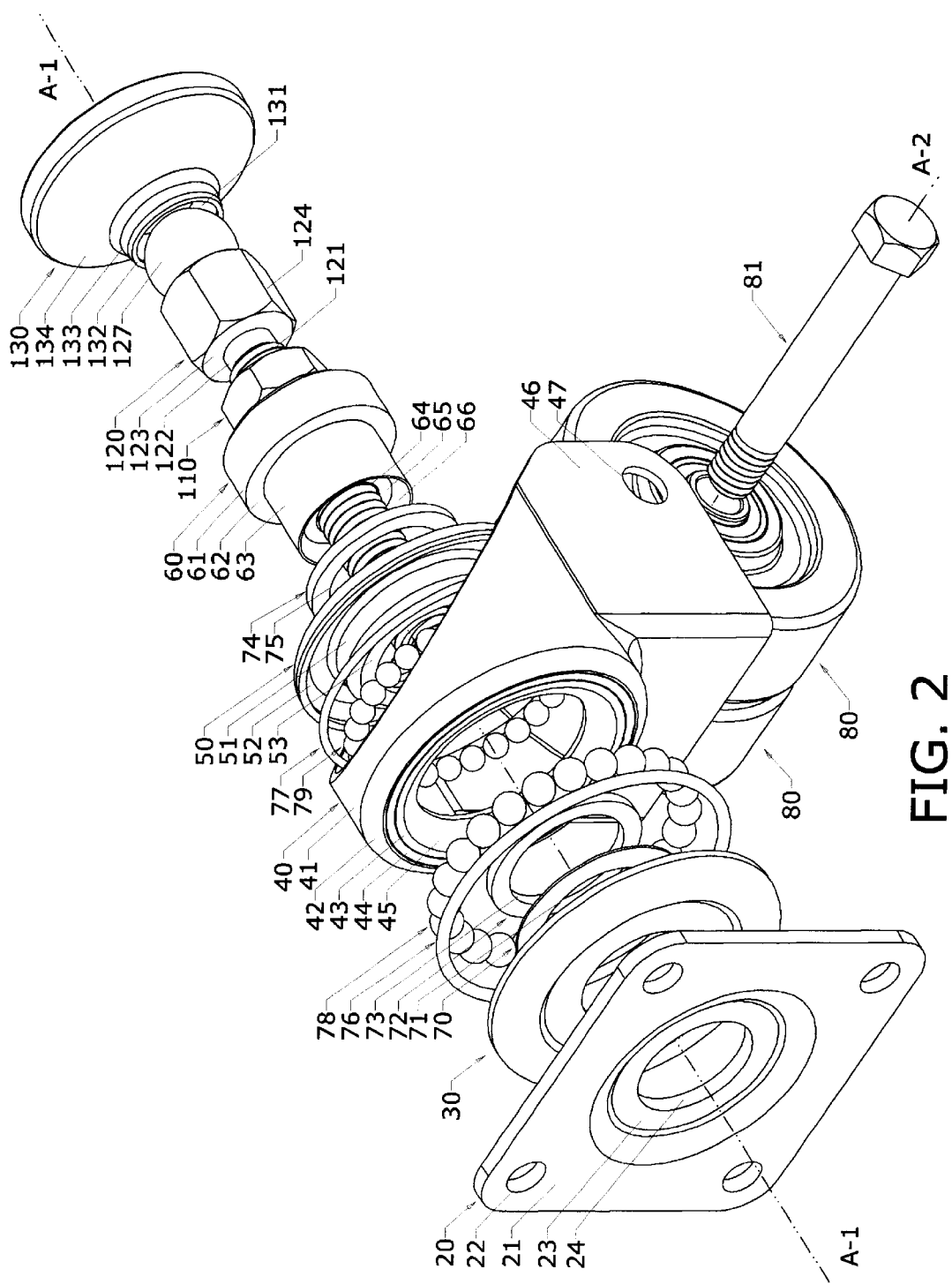
FIG. 2 is an exploded perspective view of the first embodiment looking down at the top and side of the integrated caster and leveler, with the kingpin rivet shown prior to swaging process.
Figure 3:
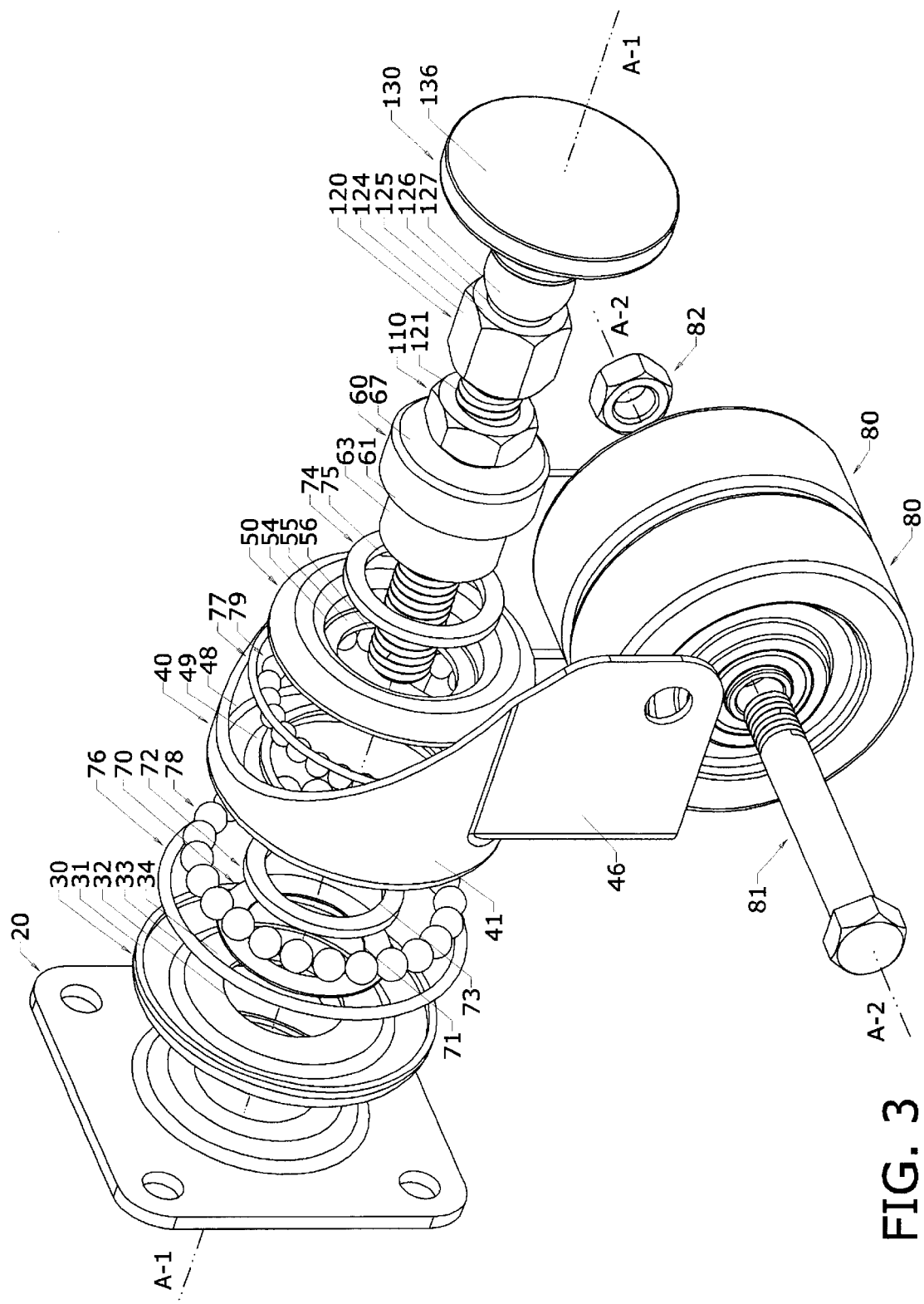
FIG. 3 is an exploded perspective view of the first embodiment looking up at the bottom and side of the integrated caster and leveler, with the kingpin rivet shown prior to swaging process.

FIGS. 1–3 show a first embodiment of the integrated caster and leveler assembly in accordance with the present invention. The construction of the integrated caster and leveler consists of several formed sheet-metal parts sandwiched together by a tubular member in the form of a kingpin rivet 60. The material of these sheet metal parts may be case hardened and plated carbon steel or alternatively, an appropriate grade of stainless steel. However, although sheet metal has many advantages, other materials may be used to construct all or parts of the device.

The kingpin rivet 60 may be machined or otherwise fabricated with a head portion 61, a sleeve 63, a seat 62 between the head and the sleeve, and a cylindrical passage with an internally cut thread 64. It should be noted that although in the embodiment shown the tubular member is a kingpin rivet that includes a cylindrical passage, one of the major functions of the tubular member is to hold the stud in selected positions. Thus, it is possible for the tubular member to have an alternatively shaped passage such as a "D" shape, a half-circle or square, or to have openings or slots or similar variations without changing this or other functions.

The sleeve 63 is dimensioned to have a clearance fit with the central apertures 24, 32, 71, 73, 56, 75 in the baseplate 20, the upper raceway 30, the shim 70, the upper spacer 72, the lower raceway 50, and the lower spacer 74, respectively. Circumscribing the end of this sleeve 63 may be a triangular lip 66 that is swaged distally outwards to permanently retain the baseplate and the thrust bearing assembly.

Figure 4:
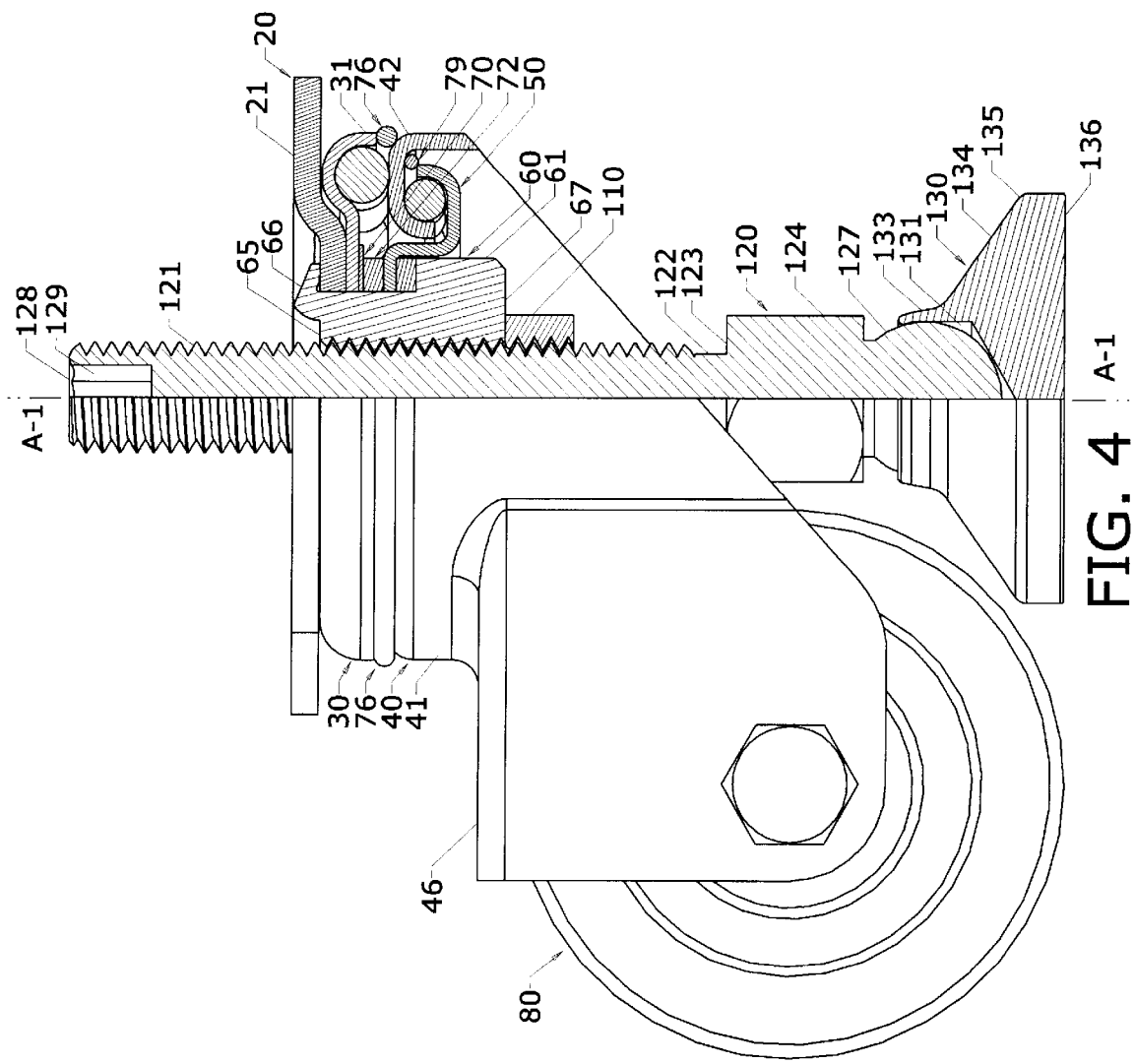
FIG. 4 is a cross-sectional side view of the integrated caster and leveler taken through section 4—4 as indicated in FIG. 1.
Figure 8:
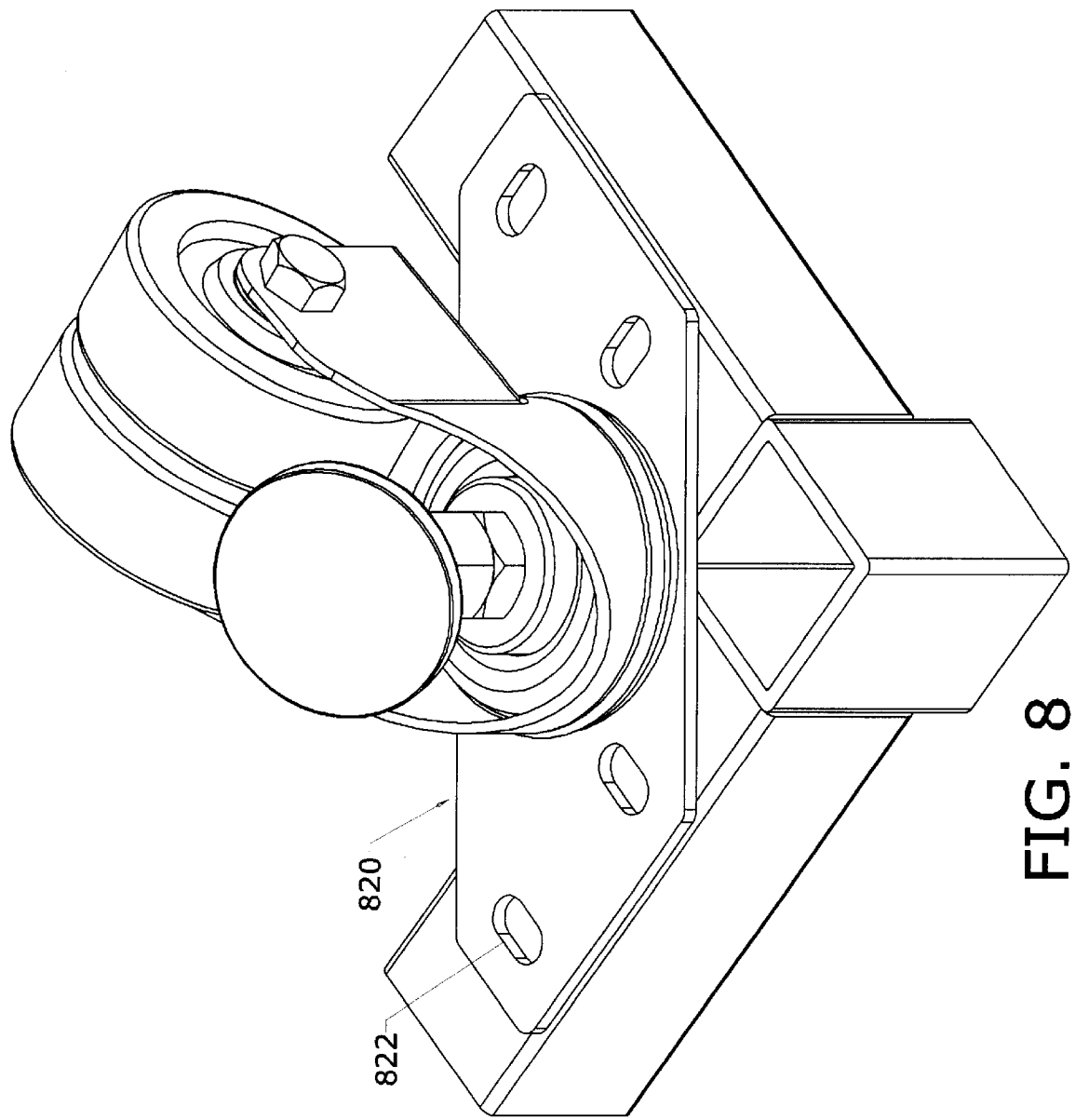
FIG. 8 is a perspective view of an alternative embodiment of the integrated caster and leveler which has a base plate designed for corner mounting.

The baseplate 20 is generally designed to mate with and affix to the underside of a frame member (not shown). Accordingly, although the baseplate could be any one of a variety of shapes, generally the baseplate is rectangular or square with a flat mating surface 21 and four mounting holes 22, or alternatively, as shown in FIG. 8, the baseplate 820 with mounting holes 822 may be substantially triangular or trapezoidal, or otherwise configured for optimal placement on the corner of a unit. It will be appreciated that other means of mounting the baseplate to equipment could be used, including welding. In both embodiments, to accommodate the kingpin rivet, the baseplate has a central aperture 24 and a recessed surface 23 that sits slightly below the end 65 of the sleeve. Swaging of the triangular lip 66 forces the metal outwards and slightly downwards, as seen in FIG. 4, mounting the kingpin rivet 60 to the baseplate 20 and holding the baseplate 20, upper raceway 30, shim 70, upper spacer 72, lower raceway 50, and lower spacer 74, in place. Alternatively, the kingpin rivet 60 may mounted to the baseplate by welding the kingpin rivet 60 to a recessed surface 23 in the baseplate 20.

The wheel chassis 40, best seen in FIGS. 2–3, may have a drawn cylindrical portion 41 with a rounded surface 42 that smoothly transitions into a flat upper surface 43. An arctuate lip 45 that extends downwards and inwards circumscribes the inside edge of this flat surface 43. The upper bearings 78 interface with a shallow groove 44 in the flat upper surface 43 while the lower bearings 72 occupy the interior 48 of the cylindrical portion 41 and interface with the lower surface 49 of the arctuate lip 45. The arctuate lip 45 is dimensioned to provide clearance between the swiveling wheel chassis 40 and the stationary parts of the thrust bearing assembly including the upper 30 and lower 50 raceways. Integrally extending from the cylindrical portion 41 may be a bifurcated fork protrusion 46 extending angularly downward and spaced peripherally outward from the kingpin rivet 60. Dual wheels 80 may fit between the fork protrusion 46 and may be rotably mounted to the chassis by means of a nut 82 and bolt 81 through a hole 47 to rotate about an axis of rotation A-2. The wheels are positioned such that this wheel axis of rotation A-2 (through the center of bolt 81) is offset from center of the wheel chassis swivel rotation about longitudinal axis A-1. Although the wheels shown are standard cylindrical wheels, it may be possible in certain applications to use spherical or other types of wheels.

Referring to FIGS. 2–4, the thrust bearing assembly circumscribes the kingpin rivet 60 and provides swiveling means for the wheel chassis 40. The thrust bearing assembly generally comprises an upper and lower raceway 30, 50 supporting an upper and lower set of ball bearings 78, 79, a shim 70 for proper bearing spacing, an upper and lower spacer 72, 74, and an upper and lower o-ring 76, 77 that protects it from environmental contamination. The upper set of ball bearings 78 bear the greatest thrust loads and are captured by a groove 33 in the upper raceway 30 and the shallow groove 44 in the wheel chassis. The outer edge 31 of the upper raceway 30 extends straight downwards for snug nesting of the upper o-ring 76 between this edge and the rounded surface 42 of the wheel chassis. In addition to providing a seal against environmental contamination, the upper and lower o-rings 76, 77 enhance the aesthetics of the overall assembly and provides a degree of swivel resistance. Some swivel resistance is desirable for smoother operation and to prevent undesirable, vibration induced swiveling of the caster when the load is transferred to the leveler.

The upper and lower spacers 72, 74 may be identical parts that serve to reduce the draw depth of the lower race for greater strength and to control the distance from the lower surface 67 of the kingpin rivet to the plane of the floor. This distance governs the amount of leveler retraction.

FIGS. 2–3 are exploded views that show the kingpin rivet prior to the swaging process. When the kingpin rivet is swaged, the shim 70 and the upper spacer 72 are captured between the lower surface 34 of the upper raceway and a flat upper surface 53 of the lower raceway. The thickness of the shim 70 is controlled to provide proper spacing for the bearings. The lower raceway 50 has a drawn cylindrical portion 51 circumscribed by an arctuate lip 52 which extends upwards and supports the lower bearings. The lip 52 enhances structural rigidity, permits the absorption of lateral loads, and allows the lower o-ring seal 77 to nest between it and the interior 48 of the wheel chassis, which is shown in FIG. 4. A cavity 54 internal to the cylindrical portion accommodates the lower spacer 74 and the head 61 of the kingpin rivet 60. The lower spacer rests between a flat inner surface 55 and the seat 62 of the kingpin rivet.

Figure 6:
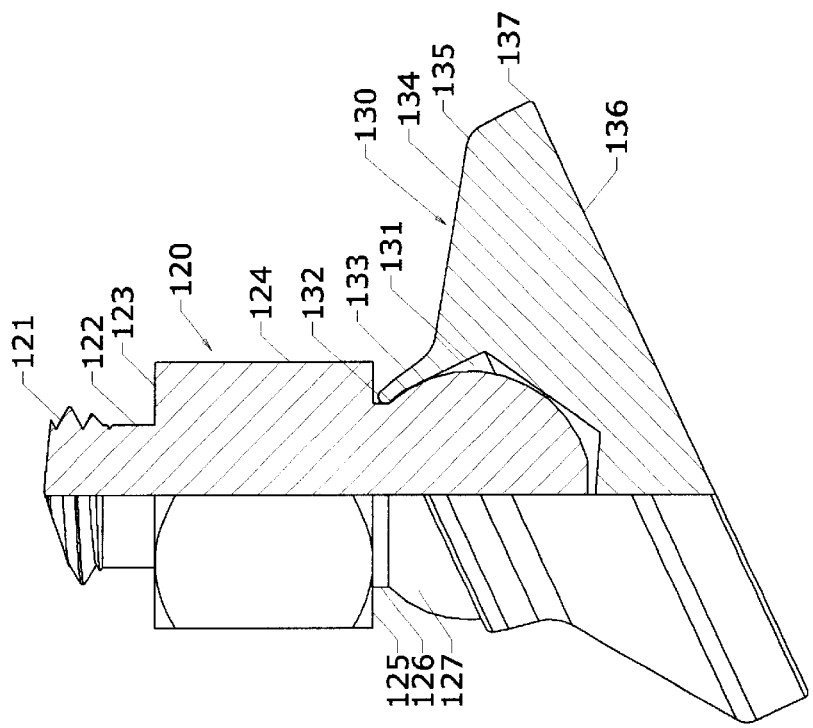
FIG. 6 is a detailed cross-sectional view of the leveler sub-assembly with the foot pitched upwards to the maximum pitch angle.
Figure 5:
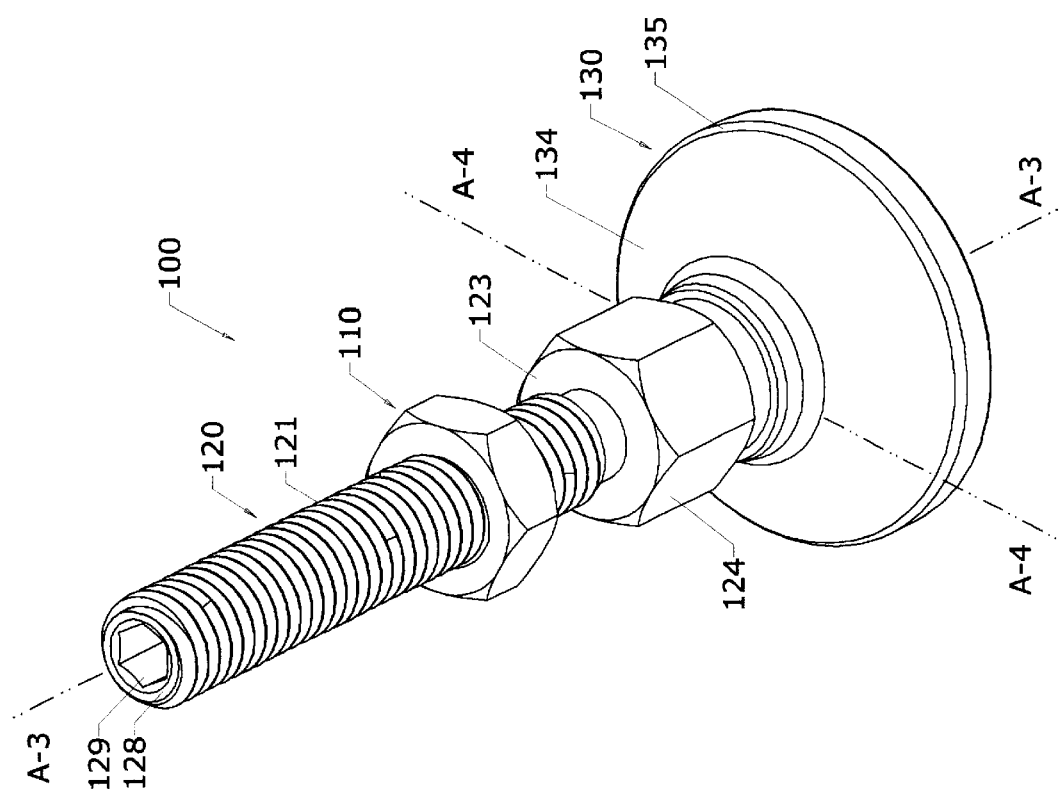
FIG. 5 is a perspective view of the leveler sub-assembly.

As shown in FIGS. 5–6, the leveling sub-assembly 100 is similar to a standard leveler and comprises a stud 120, a foot 130, and a locknut 110. The stud 120 is a machined part with a threaded portion 121 at one end 128, a "stop" which may be a hex-nut portion 124, and a ball end 127. The ball may be either integral to the stud as shown or separately attached. As shown in FIGS. 1 and 5, the end of the stud 128 opposite the ball end 127 may have a hex-socket 129, or an equivalent adjustment structure such as an external hex-cut, at the end to provide a means for overhead adjustment. The stud may also have a relief 122 at the base such that the locknut can bottom out against the top 123 of the stop or hex portion 124. The leveling sub-assembly 100 may also be adjusted from the bottom by using a wrench to engage the hex-nut portion 124. The leveling sub-assembly may be adjusted upwards to a retracted position when the unit to which the device is attached is to be moved. As shown in FIG. 7, as the leveling sub-assembly moves upwards, the foot 130 contacts the circumference of the wheels 80 and pitches about a transverse axis A-4 through the center of the stud ball end 127. When the unit is to be stationary, the leveling sub-assembly is adjusted downward to an extended position wherein the unit is supported on the foot 130. Although the embodiment shown uses a screw-type adjustment, that cooperates with a threaded, circular passage in the kingpin rivet, if the passage in the tubular member is of an alternative shape, it will be understood that the portion of the stud that cooperates with the passage will be of an appropriate shape and an alternative means would be used to hold the leveling sub-assembly in the retracted or extended positions and/or to move between these positions.

It will be understood that a unit would normally have four or more devices attached on the frame or otherwise under the unit, preferably at locations that maximize the stability of the unit.

Referring to FIGS. 5–7, the end 127 of the stud forms, or has a ball attached to form, a ball-socket joint with a substantially centered socket 131 in the foot 130. As an alternative, a combined foot and ball-socket joint may be attached to a nut, which can then be attached to the end of the stud by means of threads. A tongue 133 that circumscribes the socket may have its top end roll-swaged inwards by a controlled process to securely retain the foot. Once the assembly of the foot is completed, the foot has three rotational degrees of freedom, although the device could function with two rotational degrees of freedom. At rest, in the retracted position, the foot will contact the circumference of the wheel and be forced to assume a nominal pitch angle 138. When the equipment is moved the foot may be forced to a pitch closer to the vertical. Thus, as the caster moves and swivels, the circumference of the wheels have roughly point-wise contact with a perimeter 135 on the outer periphery of the face 134 of the foot. Consequently, the foot dynamically rotates at a pitch angle that varies between a nominal and a greater, maximum pitch angle without any marring of the foot face 134 from the rotating caster wheel. In this manner, the foot constantly responds to changes in the direction of motion such that the leading edge of the foot—which, with a circular foot as shown, would be the point on the foot perimeter 137 that is most distant from the wheels—is disposed higher than the trailing edge. Although the foot would preferably form a substantially circular perimeter to contact with the wheels for easiest pivoting when the stud is in the retracted position, it is possible that other shapes could be used that would allow the characteristic pitch to be maintained while the foot pivots, or even that the portion of the foot that contacts the floor defines a differently shaped perimeter than the perimeter that contacts the wheels.

The pitch of the foot about a transverse axis A-4 through the center of the stud ball-end 127 and the center of the foot 130 must be constrained so as not to exceed a maximum pitch angle 139 which is at or less than the angle at which the foot may bind, severe swivel impedance occurs, and/or the foot ejects from the ball-end of the stud. At this maximum pitch angle, a rim 132, preferably rounded, on the tongue contacts a small shoulder 126 extending longitudinally downwards from the hex-nut portion of the stud. The length of the shoulder 126 is such that at the maximum pitch angle 150, the tongue never touches the base 125 of the stop, as shown hex nut portion, 124. The interaction of the rounded rim on the shoulder facilitates smooth, non-binding rotation of the foot about the longitudinal axis A-3 of the stud even at the maximum pitch angle 139. A standard leveler lacks these features and is typically assembled by crimping the metal foot onto the stud which irregularly distorts the tongue.

Note that while the embodiment shown used a metal foot, it is also possible to use plastic or similar materials for the foot.

Controlling the amount of leveler retraction is necessary to ensure that the pitch angle of the foot never exceeds the maximum pitch angle 139. It will be understood that different wheel sizes will be appropriate for different applications of the device. It is also desirable for manufacturing purposes to have as many identical components as possible used for a broad size range of devices. To satisfy the criteria relating to controlling the pitch angle and to accommodate multiple wheel sizes without making any changes to the kingpin and upper bearing assembly, a particular leveling stud may correspond to each wheel size. The length of the stop or hex-nut portion 124 can be varied for each wheel size such that in the up-most or maximum retracted position, the pitch angle of the foot always reaches a nominal angle 138 that is slightly less than the maximum pitch angle 139. Generally, allowing for about 2½ degrees between the nominal angle and the maximum angle is sufficient to prevent the foot from exceeding the maximum angle; however, more or fewer degrees may be appropriate depending on the expected application, with the usual range between about 1 to 5 degrees.

Although a design that includes a tubular member, such as a king pin rivet or the like, to connect the chassis and the leveler has a number of advantages, it is also possible to construct a device without a tubular member as shown, which has a retractable leveler with a foot that, in the retracted position, moves between a nominal angle and a maximum angle and that responds dynamically to changes in the direction of motion of the wheel as described above. For example, the device could include an externally threaded stud mounted on a plate-like member that also rotably supports a wheel chassis. The leveler could include an internally threaded hex nut for attachment to the stud.

A preferred method for adjusting the leveler is from the top using a hex key wrench (not shown). Once the equipment is moved into place, the user can insert the tip of the wrench into the hex socket 129 at one end of the stud. Although the stud will be secured by the locknut 110 bearing against the lower surface 67 of the kingpin rivet, sufficient mechanical advantage can be generated to overcome the binding lock provided by the locknut 110. The stud can then be turned until the base 136 of the leveler foot 130 contacts the floor. Over the next rotation of the stud, the load will be transferred from the caster to the leveler and the wheels 80 will be suspended between the base 136 of the leveler foot 130 and the end of the stud 128 opposite the ball end 127. The length of the threaded portion 121 of the stud is controlled such that the equipment will be raised to a maximum predetermined height when the end of the stud is even with the mating surface of the baseplate. Once the equipment is at the desired height, the wheel chassis may rotate subject to the swivel resistance of the upper and lower o-rings 76, 77. It may be positioned for convenient bottom access to the locknut and subsequently tucked away beneath the equipment.

Figure 9:
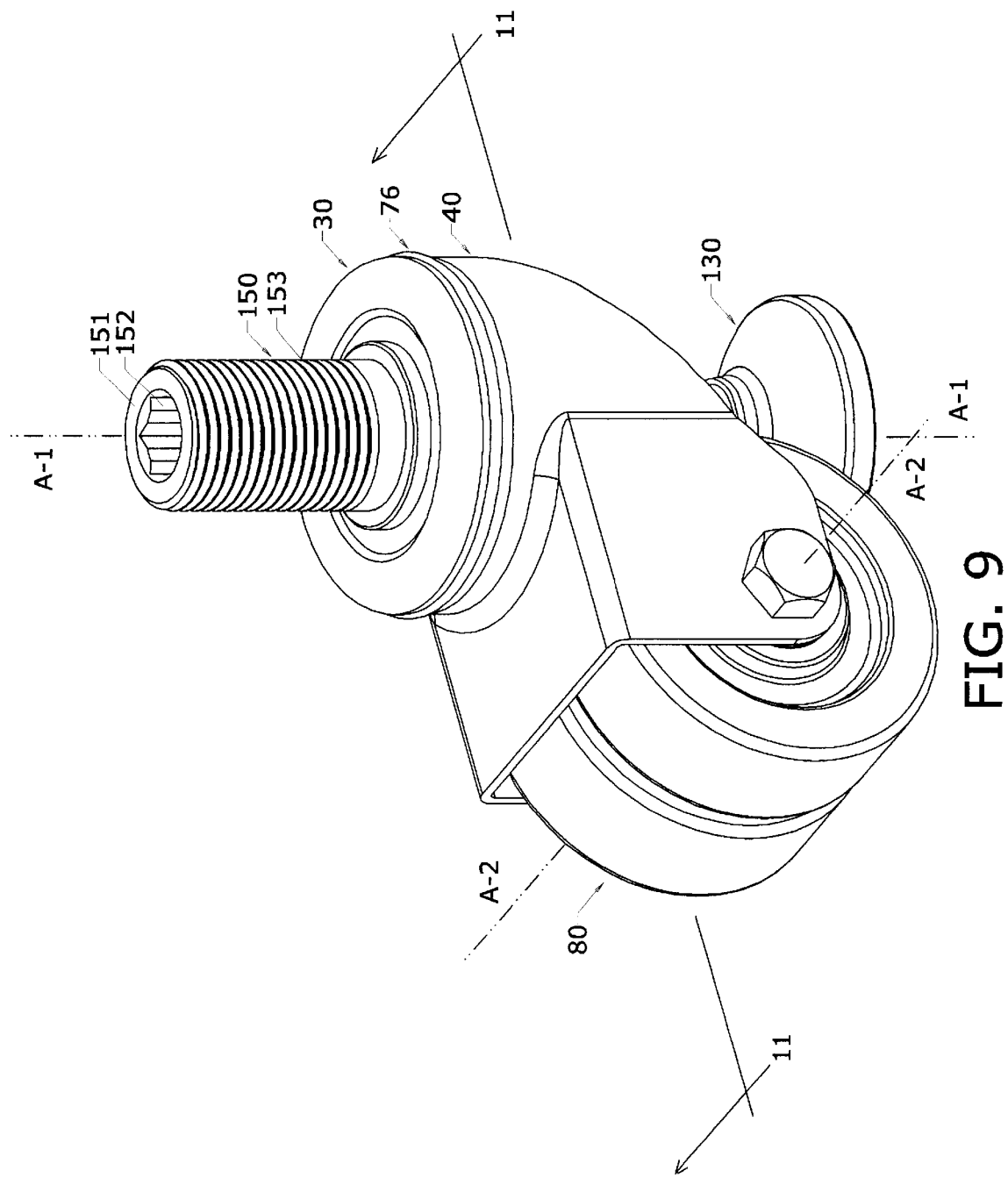
FIG. 9 is a perspective view of a second embodiment of the invention which has a threaded stem for installation on equipment.
Figure 10:
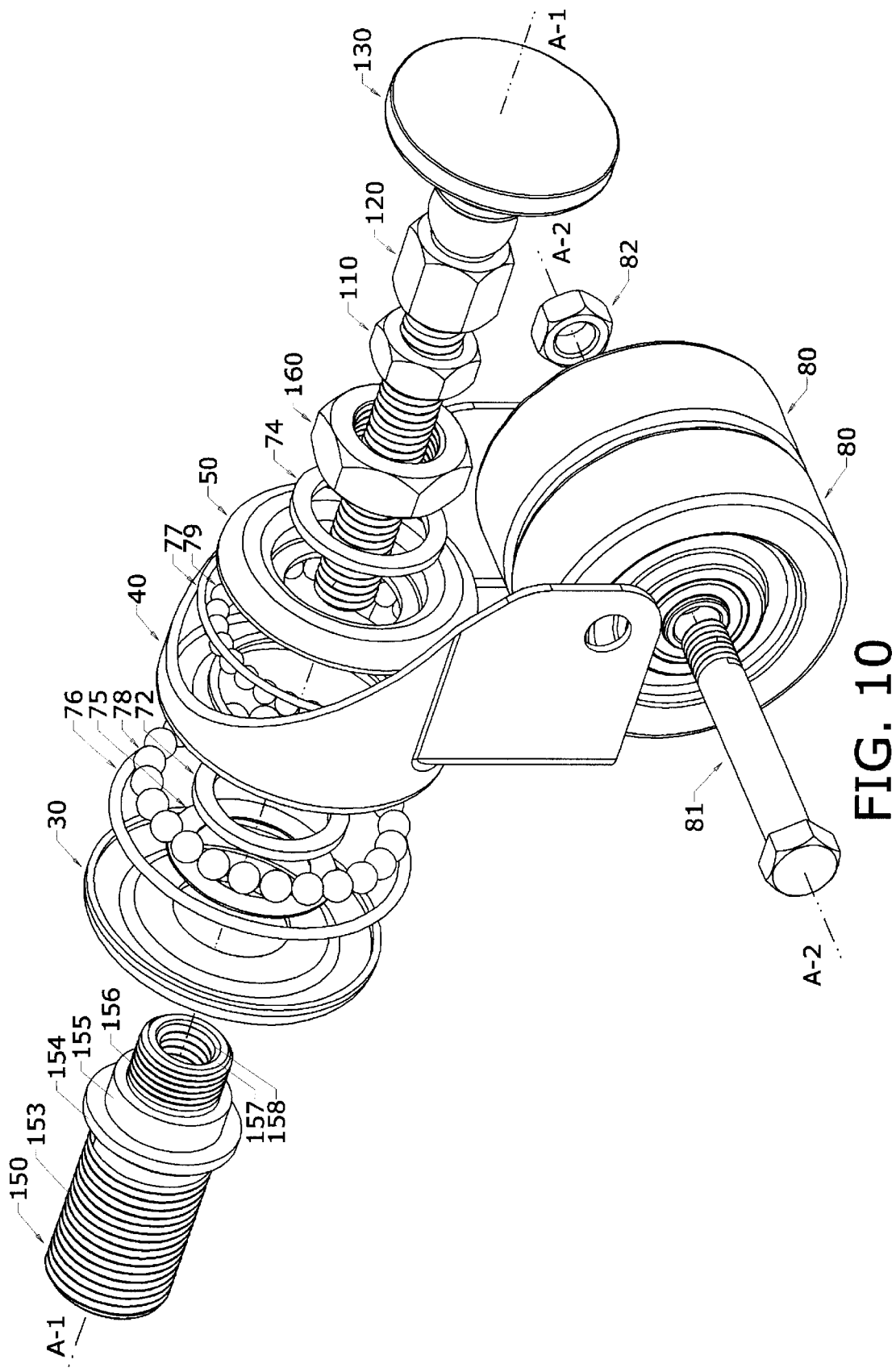
FIG. 10 is an exploded perspective view of the second embodiment of the device.
Figure 11:
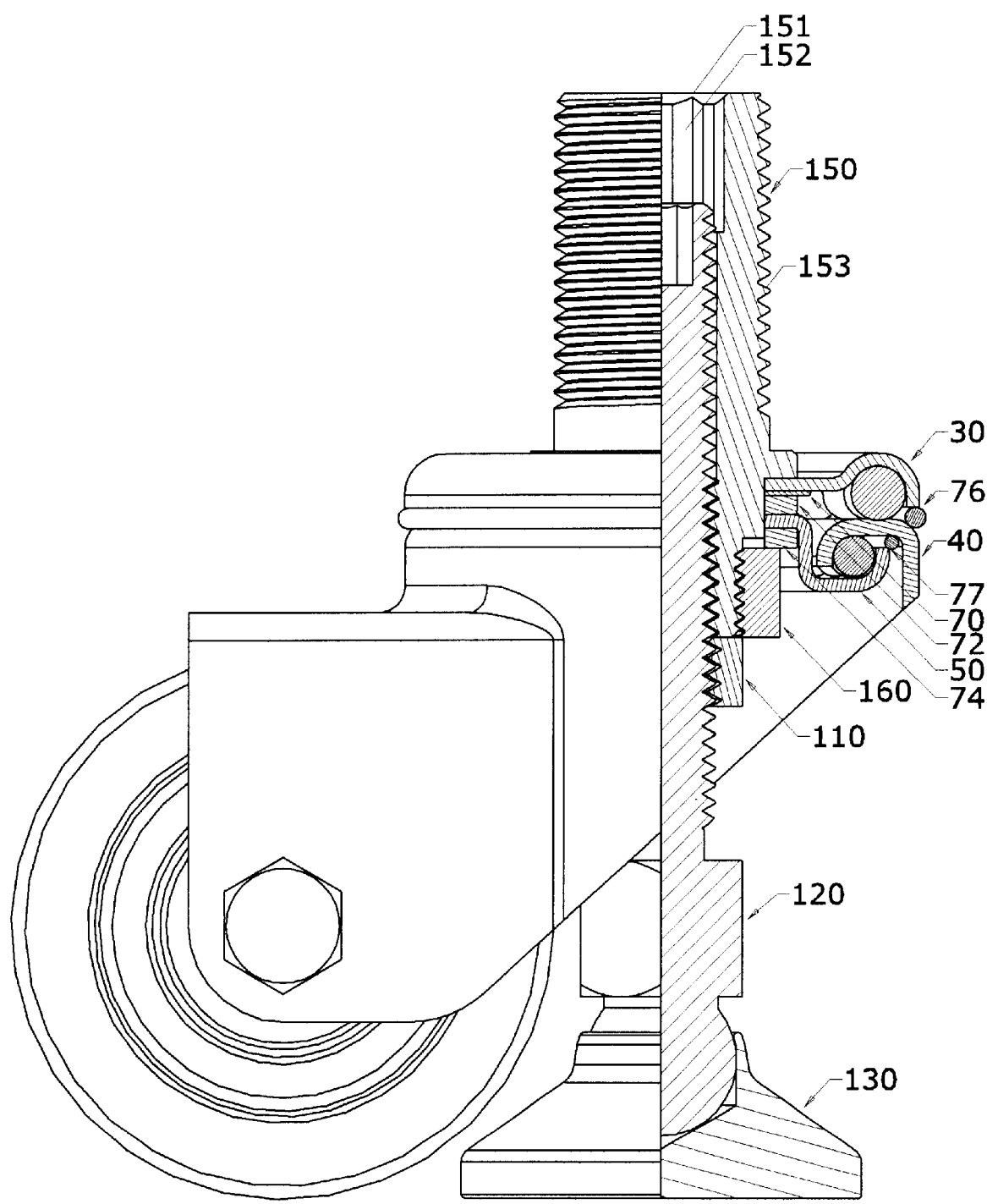
FIG. 11 is a cross-sectional side view of the second embodiment taken through section 11—11 as indicated in FIG. 9.

As seen in FIGS. 9–11 an alternative embodiment of the invention incorporates a stem 150 that permits attachment of the device through threaded and unthreaded holes on equipment. The stem is a tubular member with a large diameter external thread 153 at the top end 151, a smaller diameter external thread 156 at the bottom end 157, and an internal thread 158 also at the bottom end. The stem eliminates the need for the baseplate 20 and replaces the kingpin rivet 60. It holds the assembly together between a seat 154 and a nut 160 that engages the external thread 156. The width of the nut 160 may be made equivalent to the width of the head 61 of the kingpin rivet so that both serve the same function in controlling the amount of leveler retraction. A sleeve 155 is dimensioned to have a clearance fit with central apertures 32, 71, 73, 56, 75 in the upper raceway 30, the shim 70, the upper spacer 72, the lower raceway 50, and the lower spacer 74, respectively. The stem may also be open on both ends and have a hex 152 or other opening, formed by broaching or other method, at the top end which allows access to the hex socket 129 or other adjustment mechanism on the stud 120. Having the opening in the form of a hex may aid in installation of the device, as the stem may then be screwed onto the equipment using a hex wrench. In this embodiment, the stud 120 of the leveling sub-assembly engages the internal thread of the stem and may still be adjustable from overhead.

Thus, it is evident that a leveling sub-assembly can be combined with a caster to create a one-piece assembly with the characteristics of both. Accordingly, while the present invention has been shown and described with reference to the foregoing preferred embodiment, it will be apparent to those skilled in the art that other changes in form, connection, and detail may be made therein without departing from the spirit and scope of the invention as defined in the appended claims:

What is claimed is.

1. An integrated caster and leveler device, said device comprising:
   a leveling subassembly comprising:
      a stud having a first end and a second end and defining a longitudinal axis running between the first end and second end; and
      a foot defining a perimeter, wherein the foot is mounted on the first end of the stud to rotate with at least two rotational degrees of freedom;
   a wheel chassis assembly, comprising:
      a chassis; and
      a wheel having a rolling surface, rotably mounted to the chassis to rotate about an axis of rotation, wherein the axis of rotation is offset from the longitudinal axis defined by the stud; and
   a member for connecting the leveling subassembly to the wheel chassis and for holding the leveling subassembly in at least a retracted position and an extended position, wherein the leveling subassembly may be selectively moved between the retracted position and the extended position, the chassis is rotably mounted on the member to rotate about the longitudinal axis defined by the stud, and wherein when the leveling subassembly is in the extended position the leveling subassembly is adapted to support a piece of equipment, and when the subassembly is in the retracted position the wheel chassis is adapted to support the equipment and the foot contacts the rolling surface of the wheel, pitches between a nominal angle and a maximum angle about a transverse axis through the first end of the stud and rotates as the wheel turns such that a portion of the perimeter most distant from the wheel remains closest to the second end of the stud.

2. The device set forth in claim 1 wherein the member comprises a tubular member, and wherein the tubular member has a first end and a second end and the tubular member forms a passage at the first end of the tubular member extending toward the second end of the tubular member, said passage adopted to selectively retain the leveling subassembly within the tubular member, such that the first end of the stud extends beyond the first end of the tubular member in at least the extended position, and said passage further adopted to allow movement of the leveling subassembly between the retracted position and the extended position.

3. The device set forth in claim 2 wherein the passage is cylindrical and defines a central longitudinal axis, and the stud is cylindrical, and the longitudinal axis of the stud is approximately aligned with the longitudinal axis of the passage.

4. The device set forth in claim 3, wherein the second end of the stud is threaded and the first end of the passage is threaded to mate with the threaded second end of the stud, whereby movement of the subassembly between the retracted position and the extended position is effected by rotating the stud relative to the passage.

5. The device set forth in claim 3, wherein the second end of the stud is threaded and the first end of the passage is threaded to mate with the threaded second end of the stud, whereby movement of the subassembly between the retracted position and the extended position is effected by rotating the stud relative to the passage.

6. The device set forth in claim 5 wherein the passage extends entirely through the tubular member between the first end and second end.

7. The device set forth in claim 6 wherein the second end of the stud includes an adjustment structure for effecting movement of the subassembly.

8. The device set forth in claim 7, wherein the adjustment structure comprises an internal hex socket.

9. The device set forth in claim 2 further comprising a baseplate for mounting to a support framework for supporting the equipment, wherein the baseplate is mounted on the tubular member.

10. The device set forth in claim 9, wherein the first end of the stud further includes a ball-end centered on the longitudinal axis of the stud, and the foot further forms a substantially centered socket adapted to receive the ball-end and form a ball-socket joint, and the transverse axis runs through the ball end.

11. The device set forth in claim 10 wherein the stud further includes a stop at a selected position between the first end of the stud and the second end of the stud, and wherein the stop is adapted to cooperate with the tubular member to prevent the stud from moving further into the tubular member when the stud is in the retracted position.

12. The device set forth in claim 10 wherein the stud further includes a hex portion at a selected position between the between the first end of the stud and the second end of the stud.

13. The device set forth in claim 12 wherein the hex portion of the stud is adapted to cooperate with the tubular member to prevent the stud from moving further into the tubular member when the stud is in the retracted position.

14. The device set forth in claim 13, wherein the foot further includes a tongue and rim circumscribing the socket wherein the tongue is swaged inward to retain the ball in the socket, and wherein the rim is of a selected height such that as the foot pitches to the maximum angle the rim contacts the hex portion of the stud whereby the foot is prevented from pitching beyond the maximum angle.

15. The device set forth in claim 11, wherein the stop has a first end near the first end of the stud and a second end near the second end of the stud and wherein the first end of the stop forms a shoulder of a selected height, and wherein the foot further includes a tongue and rim circumscribing the socket wherein the tongue is swaged inward to retain the ball in the socket, and the rim cooperates with the shoulder such that as the foot pitches to the maximum angle the rim contacts the shoulder, whereby the foot is prevented from pitching beyond the maximum angle.

16. The device set forth in claim 10, wherein the foot further includes a tongue and rim circumscribing the socket wherein the tongue is swaged inward to retain the ball in the socket, and the rim is of a selected height such that as the foot pitches to the maximum angle the rim contacts the stud, whereby the foot is prevented from pitching beyond the maximum angle.

17. The device of claim 10 wherein the ball-end is formed integrally with the first end of the stud.

18. The device set forth in claim 9 wherein the passage extends entirely through the tubular member between the first end and second end.

19. The device set forth in claim 18 wherein the baseplate forms an opening adapted to accept the tubular member such that the baseplate is mounted between the first end and second end of the tubular member, and wherein the second end of the stud includes an adjustment structure for effecting movement of the subassembly.

20. The device set forth in claim 19, wherein the adjustment structure comprises an internal hex socket.

21. The device set forth in claim 18, wherein the second end of the stud forms an internal hex socket.

22. The device set forth in claim 2 wherein the stud further includes a stop at a selected position between the first end of the stud and the second end of the stud, and wherein the stop is adapted to cooperate with the tubular member to prevent the stud from moving further into the tubular member when the stud is in the retracted position.

23. The device set forth in claim 2 wherein the stud further includes a hex portion at a selected position between the between the first end of the stud and the second end of the stud.

24. The device set forth in claim 23 wherein the hex portion of the stud is adapted to cooperate with the tubular member to prevent the stud from moving further into the tubular member when the stud is in the retracted position.

25. The device of claim 2 wherein the maximum angle is between 1 and 5 degrees greater than the nominal angle.

26. The device of claim 2 wherein the maximum angle is approximately 2.5 degrees greater than the nominal angle.

27. The device set forth in claim 2, wherein the first end of the stud further forms a ball-end substantially centered on the longitudinal axis of the stud, and the foot further forms a substantially centered socket adapted to receive the ball-end of the stud and form a ball-socket joint, and the transverse axis runs through the ball end.

28. The device set forth in claim 2 wherein the passage extends entirely through the tubular member between the first end and second end.

29. The device set forth in claim 2, wherein the perimeter is substantially circular.

30. The device set forth in claim 2 wherein the foot is substantially circular.

31. The device of claim 1 wherein the maximum angle is between 1 and 5 degrees greater than the nominal angle.

32. The device of claim 1 wherein the maximum angle is approximately 2.5 degrees greater than the nominal angle.

33. An integrated caster and leveler device for moving and supporting equipment that includes a support framework, said device comprising:
   a leveling subassembly comprising:
      a stud having a first end and a threaded second end and defining a longitudinal axis running between the first end and second end; and
      a foot defining a substantially circular perimeter, wherein the foot is mounted on the first end of the stud to rotate with three rotational degrees of freedom;
   a tubular member, wherein the tubular member has a first end and a second end and the tubular member forms a threaded, cylindrical passage at the first end of the tubular member adapted to mate with the second end of the stud, said passage extending through the tubular member to the second end and defining a central longitudinal axis, said passage adopted to receive the second end of the stud at the first end of the tubular member, to selectively retain the leveling subassembly within the tubular member in at least a retracted position and an extended position, and to allow movement of the subassembly between the retracted position and the extended position by rotating the stud relative to the passage and wherein the longitudinal axis of the stud is approximately aligned with the longitudinal axis of the passage;
   a wheel chassis assembly, comprising:
      a chassis rotably mounted on the tubular member to rotate about the longitudinal axis defined by the stud; and
      a wheel having a rolling surface, rotably mounted to the chassis to rotate about an axis of rotation, wherein the axis of rotation is offset from the longitudinal axis defined by the stud; and
   wherein when the subassembly is in the extended position the leveling subassembly is adapted to support the equipment, and when the subassembly is in the retracted position the wheel chassis is adapted to support the equipment and the foot contacts the rolling surface of the wheel and pitches about a transverse axis through the first end of the stud between a nominal angle and a maximum angle between 1 and 5 degrees greater than the nominal angle and the foot rotates as the wheel turns such that that point of the perimeter most distant from the wheel remains closest to the second end of the stud, and wherein the first end of the stop forms a shoulder of a selected height, and wherein the foot further includes a tongue and rim circumscribing the socket wherein the tongue is swaged inward to retain the ball in the socket, and the rim cooperates with the shoulder such that as the foot pitches to the maximum angle the rim contacts the shoulder, whereby the foot is prevented from pitching beyond the maximum angle.

34. The device of claim 33, wherein the tubular member is a kingpin rivet and further comprising a baseplate mounted to said kingpin rivet.

* * * * *